United States Patent
Benson (10) Patent No.: US 7,428,913 B2
(45) Date of Patent: Sep. 30, 2008

(54) VALVE ASSEMBLY HAVING ARTICULATING RIGID SEATING SURFACE

(75) Inventor: Richard A. Benson, Bedford, MA (US)

(73) Assignee: MKS Instruments, Inc., Andover, MA (US)

( * ) Notice: Subject to any disclaimer, the term of this patent is extended or adjusted under 35 U.S.C. 154(b) by 589 days.

(21) Appl. No.: 11/114,388

(22) Filed: Apr. 26, 2005

(65) Prior Publication Data

US 2006/0237064 A1 Oct. 26, 2006

(51) Int. Cl.
*F16K 31/04* (2006.01)

(52) U.S. Cl. ............ 137/487.5; 251/129.15; 251/88

(58) Field of Classification Search ........... 137/454.2, 137/486, 487.5; 251/129.15, 333, 359, 360, 251/88
See application file for complete search history.

(56) References Cited

U.S. PATENT DOCUMENTS

| | | | |
|---|---|---|---|
| 4,796,854 A | | 1/1989 | Ewing et al. |
| 4,903,938 A | * | 2/1990 | Nishizawa et al. ......... 251/61.5 |
| 5,094,430 A | * | 3/1992 | Shirai et al. ............ 251/129.06 |
| 5,100,100 A | * | 3/1992 | Benson et al. ......... 251/129.06 |
| 5,145,147 A | * | 9/1992 | Nakazawa et al. ..... 251/129.06 |
| 5,217,200 A | * | 6/1993 | Hutchings et al. ............. 251/86 |
| 5,727,769 A | | 3/1998 | Suzuki |
| 5,785,297 A | * | 7/1998 | Ha ........................ 251/129.14 |
| 6,076,550 A | * | 6/2000 | Hiraishi et al. ................ 251/38 |
| 6,505,812 B1 | | 1/2003 | Anastas |

* cited by examiner

*Primary Examiner*—Kevin L Lee
(74) *Attorney, Agent, or Firm*—McDermott Will & Emery, LLP (57) ABSTRACT

A valve assembly including a valve body having an orifice, and a valve member received in the valve body and movable along an axis with respect to the orifice. The valve member includes a cup in an end of the valve member and the cup has an end wall facing the orifice of the valve body. A fulcrum extends from the end wall of the cup towards the orifice, and a plug is received in the cup against the fulcrum and opposite the orifice of the valve body. When the valve member is moved along the axis towards the orifice, the plug contacts the valve body to seal the orifice. The valve assembly also includes a flat spring having an outer portion secured to the end of the valve member and flexible arms retaining the plug in the cup, so that the plug can be articulated about the fulcrum and properly aligned with the valve body to fully seal the orifice when the valve member is moved along the axis towards the orifice.

17 Claims, 9 Drawing Sheets

VALVE ASSEMBLY HAVING ARTICULATING RIGID SEATING SURFACE

FIELD OF THE DISCLOSURE

The present disclosure relates to the field of fluid flow control and, more particularly, to a valve assembly. Even more particularly, the present disclosure relates to a valve assembly having rigid seating surfaces, and wherein at least one of the rigid seating surfaces articulates to ensure a suitable seal.

BACKGROUND OF THE DISCLOSURE

Fluid valves exist in a wide variety of forms and sizes, serving a multitude of purposes, handling flowable materials whose characters range from light gaseous to heavy slurries and near-solids, and operable at various speeds under controls as diverse as simple binary (ON-OFF), proportional, direct-manual and remote-electrical. Those which are capable of responding quickly to govern even relatively large flows with precision, and with expenditure of little electrical power, are of special interest in certain industrial processing, such as the automatic regulation of gases in semiconductor and integrated-circuit manufacturing. Mass flow controllers, for example, are widely used in semiconductor and integrated-circuit manufacturing to control the delivery of process gases, and the mass flow controllers include such valves.

U.S. Pat. Nos. 4,796,854, 5,727,769, and 6,505,812, which are all assigned to the assignee of the present disclosure, show examples of solenoid proportioning valve assemblies. The disclosed valve assemblies all include movable valve members positioned by an armature to open and close a valve orifice.

The valve assemblies may use metals seals or elastomeric seals. The use of metal sealing, or seating, surfaces eliminates permeation from the atmosphere and the outgassing and particle generation inherent to elastomeric seals. Other materials, such as glass, sapphire, or ceramic, may be used as the seating surfaces to avoid chemical degradation from the particular fluid being controlled by the valve assembly, and/or degradation due to temperatures and pressures, for example.

It is often preferable to use sapphire in place of metal in the seating surfaces of valve assemblies. In high accuracy valve assemblies used for the precise delivery of gases, metal seating surfaces may require a hand-lapping final operation to customize orifice surfaces to provide suitable sealing. Such lapping operations however, are labor intensive and increase the manufacturing costs of the valve assemblies. In addition, metal-lapped surfaces can be attacked at high temperatures by corrosive fluids, which degrade sealing over time. Sapphire, which is a very hard material that can be made flat and smooth, is less susceptible to such degradation.

What is still desired is a new and improved valve assembly. The valve assembly will preferably provide improved cut-off sealing, eliminate the need for hand-crafted metal parts and allow the use of impervious non-metal material for seating surfaces, and provide stable long term control valve shut-off capability.

SUMMARY OF THE DISCLOSURE

The present disclosure provides a valve assembly including a valve body having an orifice, and a valve member received in the valve body and movable along an axis with respect to the orifice. The valve member includes a cup in an end of the valve member and the cup has an end wall facing the orifice of the valve body. A fulcrum extends from the end wall of the cup towards the orifice, and a plug is received in the cup against the fulcrum and opposite the orifice of the valve body. When the valve member is moved along the axis towards the orifice, the plug contacts the valve body to seal the orifice. The valve assembly also includes a flat spring having an outer portion secured to the end of the valve member and flexible arms retaining the plug in the cup so that the plug can be articulated about the fulcrum and properly aligned with the valve body to fully seal the orifice when the valve member is moved along the axis towards the orifice.

Among other benefits and aspects of the present disclosure, the articulating plug of the valve assembly ensures that seating surfaces of the plug and the valve body will be properly aligned when the valve member is moved towards the orifice to seal the orifice, such that the valve assembly provides improved cut-off sealing. The articulating plug eliminates the need for hand-crafted metal parts and allows the use of impervious non-metal material, such as sapphire, for the seating surfaces. Sapphire seating surfaces, in turn, provide stable, long-term control valve shut-off capability.

These and other features and benefits of the present disclosure will become more apparent upon reading the following detailed description in combination with the accompanying drawings.

BRIEF DESCRIPTION OF THE DRAWINGS

The foregoing and other features and advantages of this disclosure will be better understood from the detailed description and the drawings, in which.

Like reference characters designate identical or corresponding components and units throughout the several views.

DETAILED DESCRIPTION OF EXEMPLARY EMBODIMENTS

Figure 3:
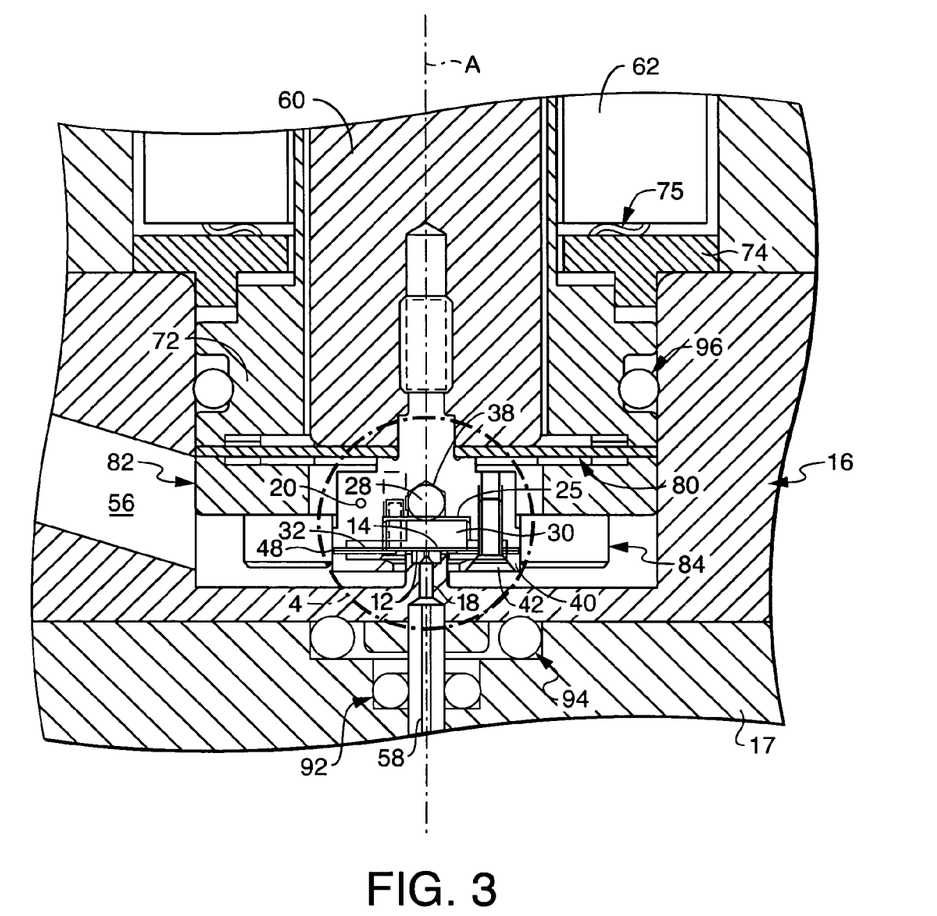
FIG. 3A is an enlarged sectional view of the valve assembly of FIG. 1, as contained in the circled portion "3" of FIG. 2.
FIG. 3B is side sectional view of an exemplary mass flow controller configured with a value assembly indicated by dashed box with FIG.3A.
Figure 3A:
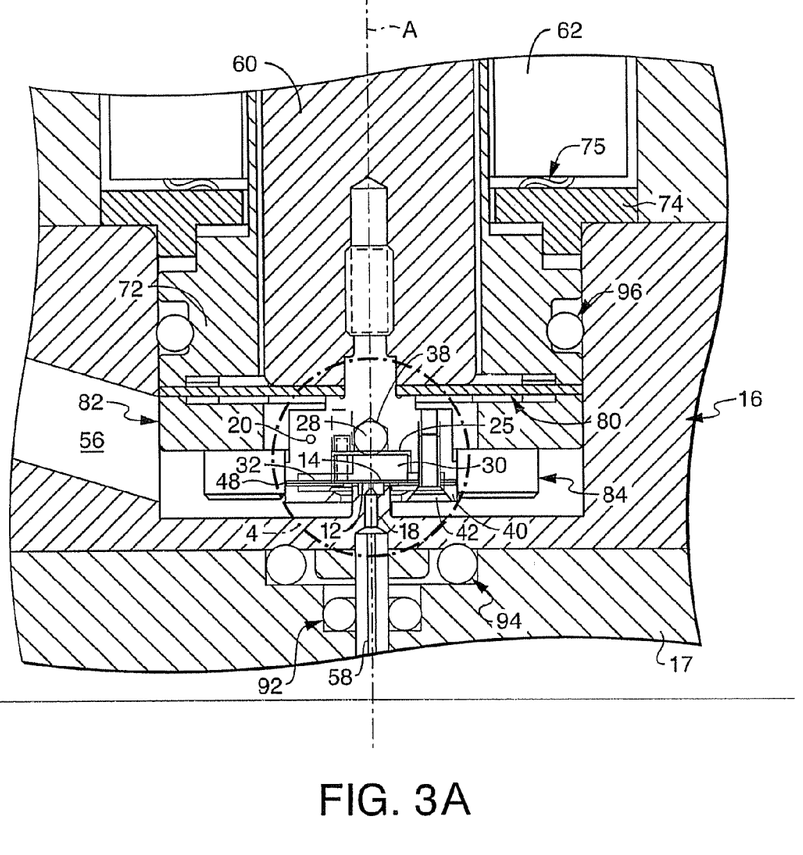
Figure 3B:
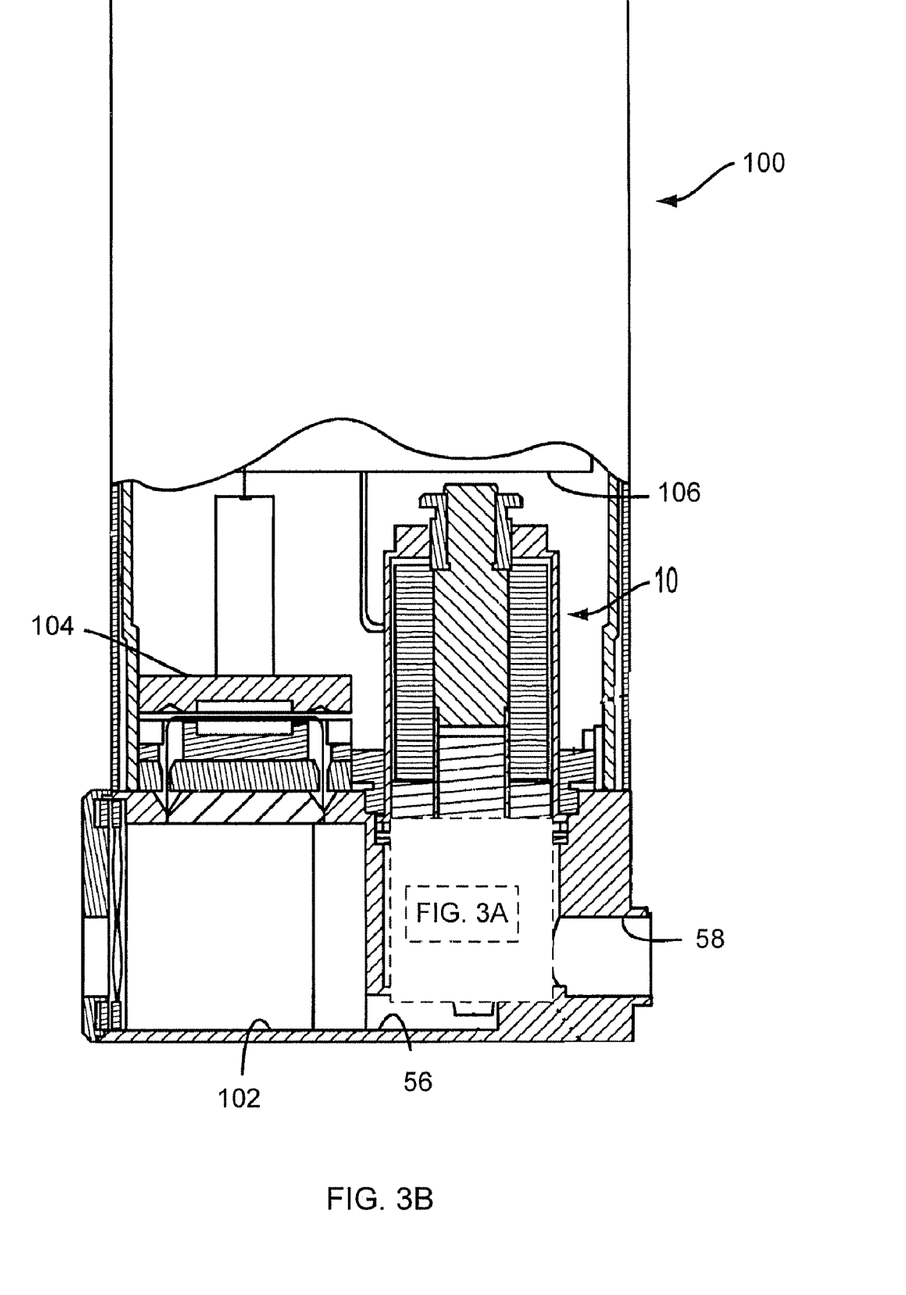
Figure 4:
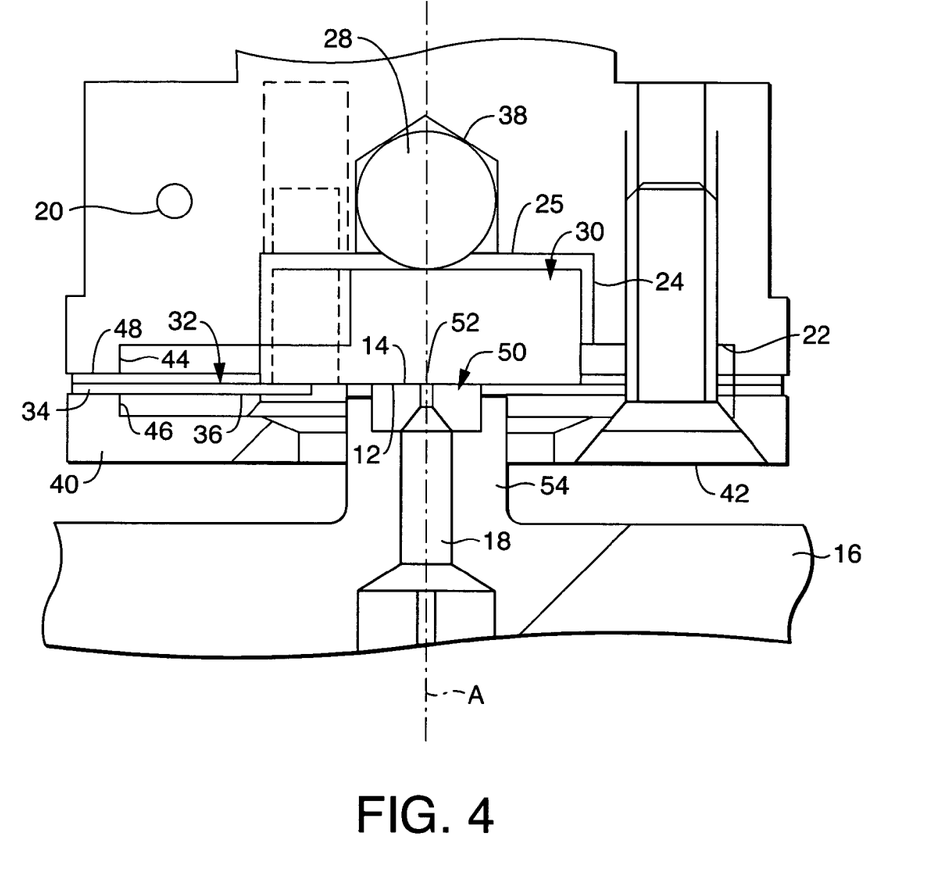
FIG. 4 is an even further enlarged sectional view of the valve assembly of FIG. 1, as contained in the circled portion "4" of FIG. 3.

Referring to FIGS. 1 through 9, the present disclosure generally provides a valve assembly 10 that includes sapphire seating surfaces 12, 14, which are shown best in FIGS. 3 and 4. The novel design of the valve assembly 10 of the present disclosure allows at least one of the seating surfaces to be articulated, or toggled, so that the seating surfaces 12, 14, which are planar, are automatically made parallel during use. The parallel condition of the planar seating surfaces 12, 14 ensure that the seating surfaces provide improved cut-off sealing. In addition, the use of sapphire seating surfaces 12, 14 eliminates the need for hand-crafted metal parts, and provides stable long term control valve shut-off capability (i.e., no degradation of the seating surfaces 12, 14).

Figure 2:
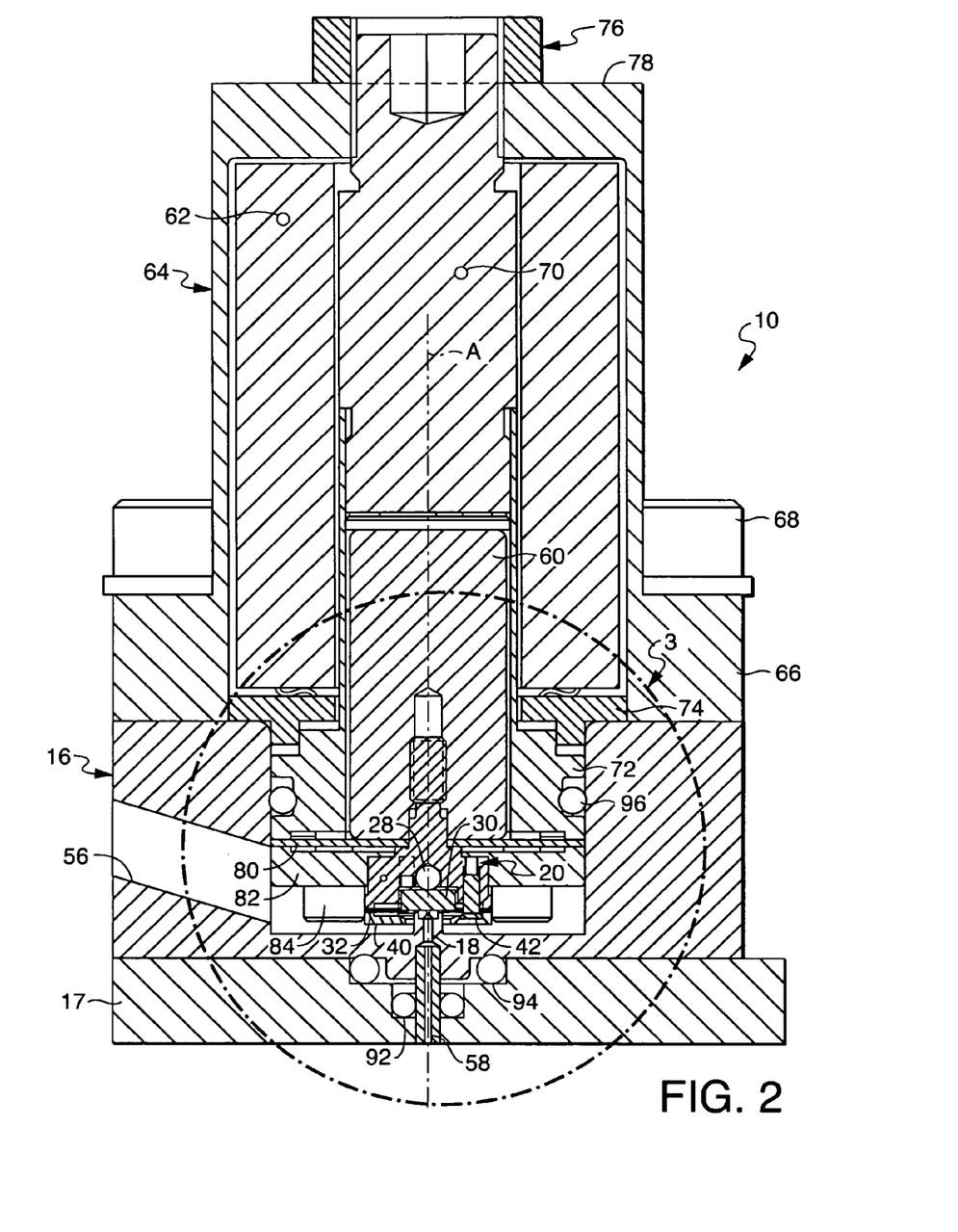
FIG. 2 is an enlarged sectional view of the valve assembly taken along line 2-2 of FIG. 1.
Figure 5:
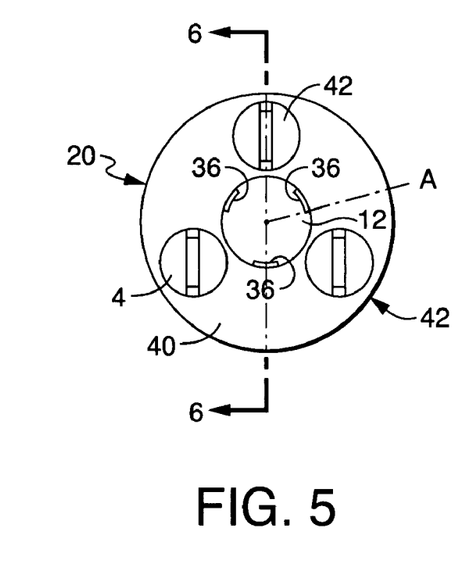
FIG. 5 is an end plan view of a valve member of the valve assembly of FIG. 1, showing a clamping ring secured with screws.
Figure 8:
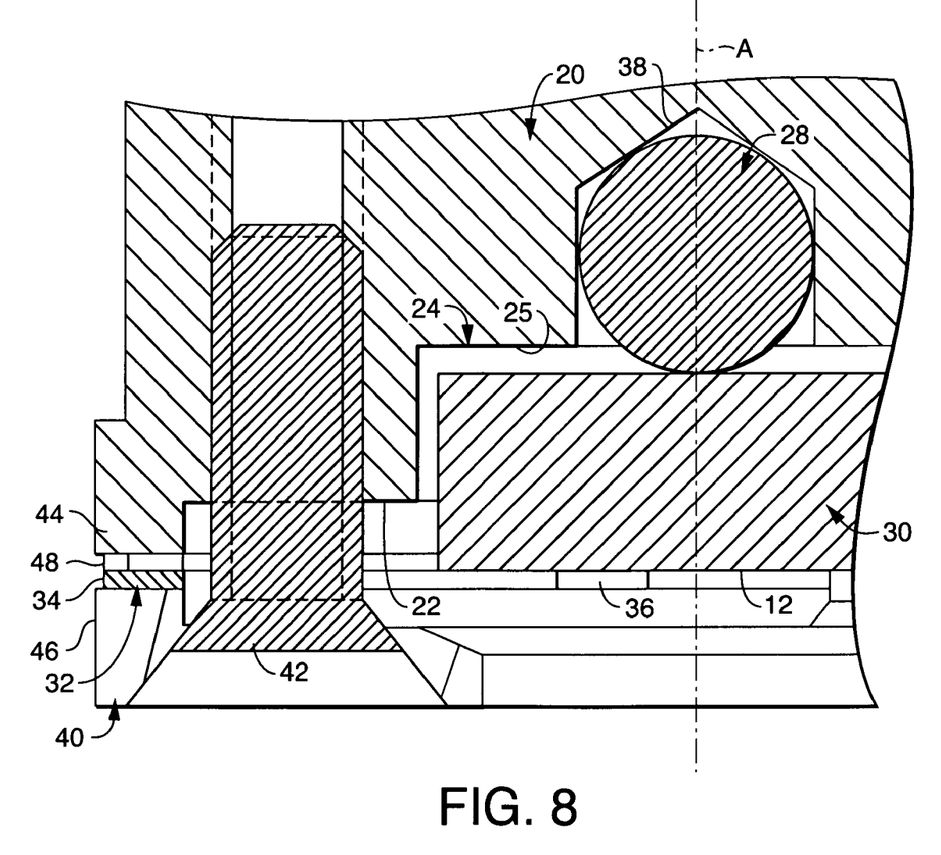
FIG. 8 is an enlarged sectional view of valve member of the valve assembly of FIG. 1, as contained in the circled portion "8" of FIG. 6.
Figure 9:
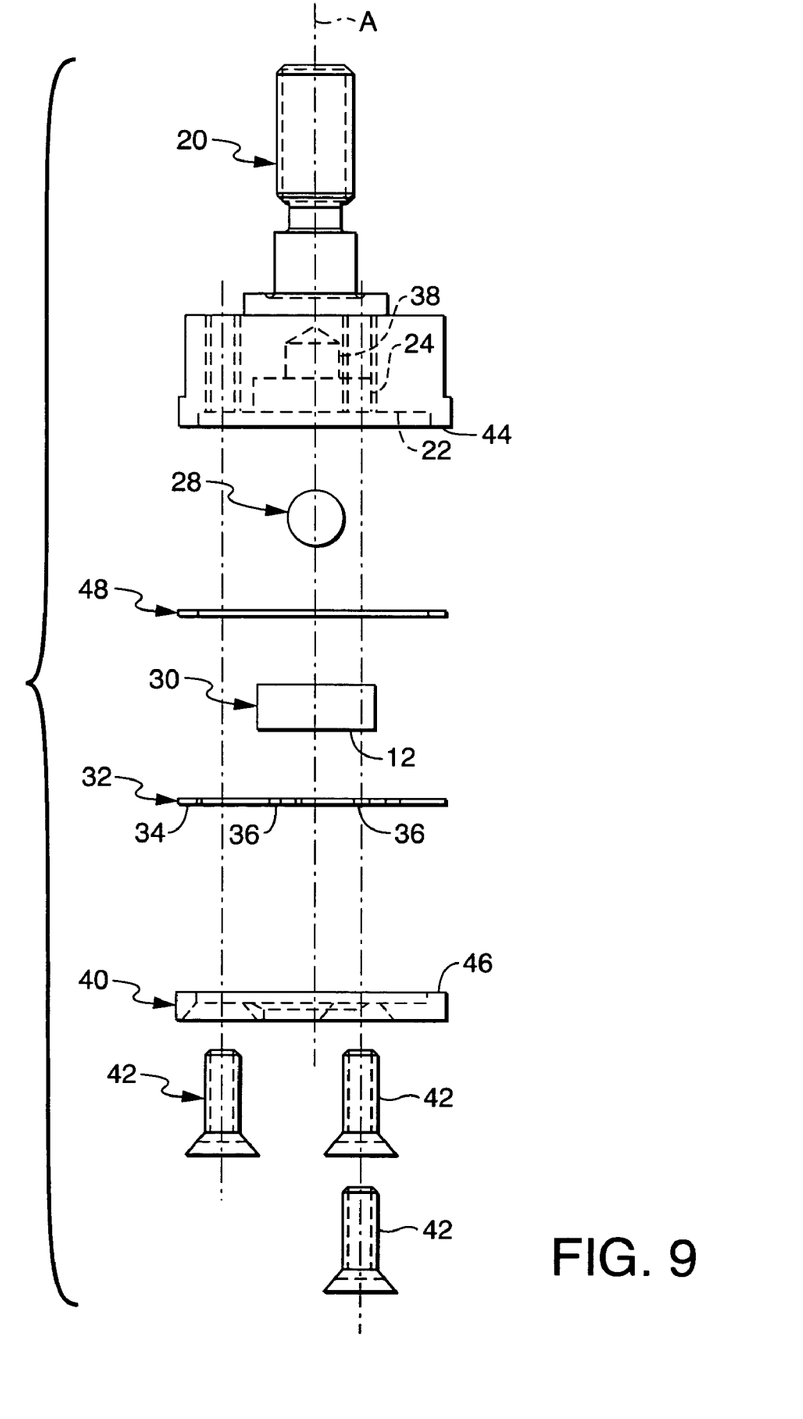
FIG. 9 is an exploded side elevation view of the valve member of the valve assembly of FIG. 1.

Referring to FIGS. 2 through 4, the valve assembly 10 includes a valve body 16 having an orifice 52 positioned over a passageway 18, and a valve member 20 received in the valve body 16 and movable along an axis A with respect to the orifice 52. Referring also to FIGS. 5, 8 and 9, the valve member 20 includes a cup 24 in an end 22 of the valve member 20, and the cup 24 has an end wall 25 facing the orifice 52 of the valve body 16. A fulcrum 28 extends from the end wall 25 of the cup 24 towards the orifice 52, and a plug 30 is received in the cup 24 of the valve member 20 against the fulcrum 28 and opposite the orifice 52 of the valve body 16 and defines one of the seating surface 12. When the valve member 20 is moved along the axis A towards the orifice 52, the seating surface 12 of the plug 30 contacts the seating surface 14 of the valve body 16 to seal the orifice 52.

Figure 6:
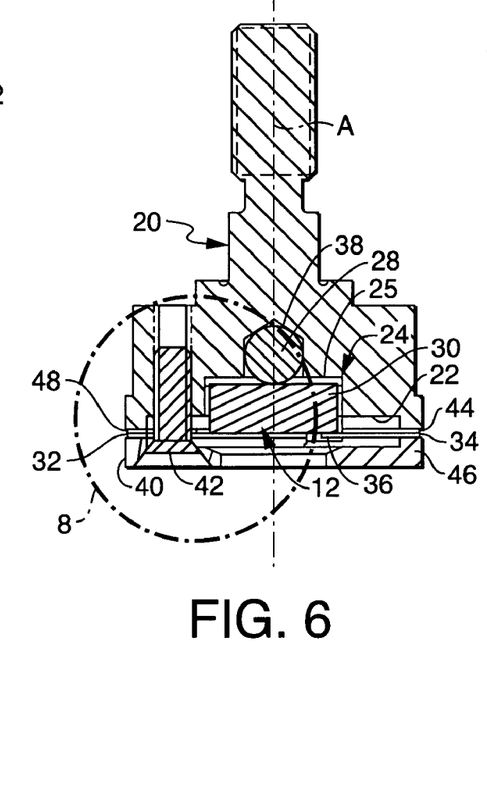
FIG. 6 is an enlarged sectional view of the valve member of the valve assembly of FIG. 1, taken along line 6-6 of FIG. 5.
Figure 7:
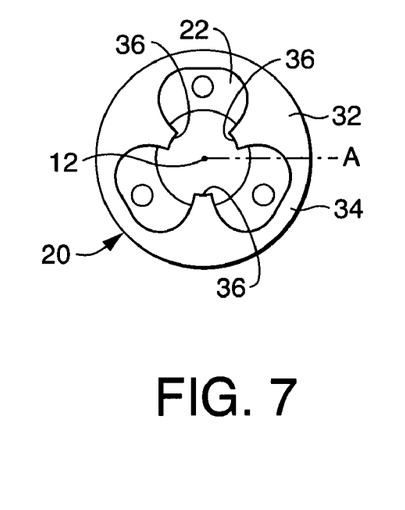
FIG. 7 is an end plan view of the valve member of the valve assembly of FIG. 1, showing the clamping ring removed to revile a flat spring.

A flat spring 32, which is also shown in FIGS. 6 and 7, has an outer portion 34 secured to the end 22 of the valve member 20 and flexible arms 36 retaining the plug 30 in the cup 24 so that the plug 30 can be articulated, or toggled, about the fulcrum 28 and properly aligned with the valve body 16 to fully seal the orifice 52 when the valve member 20 is moved along the axis A towards the orifice 52. In particular, the present disclosure allows the seating surface 12 of the plug 30 to be articulated, or toggled, so that the seating surfaces 12, 14, which are planar, automatically are made parallel during movement of the valve member 20, so that the seating surfaces 12, 14 provide improved cut-off sealing.

The fulcrum 28 upon which the plug 30 can be toggled can take many forms. However, in the exemplary embodiment shown, as shown best in FIGS. 2-4, 6, 8, and 9, the fulcrum comprises a spherical ball 28 received in a socket 38 in the end wall 25 of the cup 24. The ball 28 is sized with respect to the socket 38 so that a portion of the ball 28 extends into the cup 24 to form the fulcrum 28 upon which the plug 30 can be toggled. In the exemplary embodiment shown, the plug 30 is cylindrical and has a width, or diameter, that is greater than a thickness, or height, of the plug 30. The width of the plug 30 is also about twice the diameter of the spherical ball 28.

In the exemplary embodiment shown, the outer portion 34 of the flat spring 32 is annular and the flat spring 32 includes at least three of the flexible arms 36, which extend straight and radially inwardly from the annular outer portion 34 towards the axis A of the valve member 20, as shown best in FIG. 7. As shown in FIGS. 2 through 9, the flat spring 32 is secured to the end 22 of the valve member 20 with a clamping ring 40, which in turn is secured to the valve member 20 with screws 42. The end 22 of the valve member 20 includes a continuous ridge 44 receiving the flat spring 32 and the clamping ring 40 includes a continuous ridge 46 securing the flat spring 32 against the continuous ridge 44 of the valve member 20. The ridges 44, 46 provide space for the arms 36 of the flat spring 32 to flex freely. A spacer ring 48 is positioned between the continuous ridge 44 of the valve member 20 and the flat spring 32, as shown best in FIGS. 8 and 9. The spacer ring 48 helps to ensure that the plug 30 is not pressed too tightly or too loosely against the fulcrum 28.

As shown best in FIGS. 2 through 4, the assembly 10 also includes a valve seat 50 secured to the valve body 16. The valve seat 50 defines the planar seating surface 14 and the orifice 52, through which all fluid flow is directed. The orifice 52 may also be considered a short tube due to its length to diameter ratio. The valve seat 50 is sized and adapted so that the planar seating surface 14 of the valve seat 50 extends through central openings of the flat spring 32 and the clamping ring 40 to contact the planar seating surface 12 of the plug 30 to seal the orifice 52 when the valve member 20 is moved along the axis A towards the valve seat 50.

In one exemplary embodiment, the valve seat 50 and the plug 30 are made of a rigid, impervious non-metal material comprised of sapphire, and the spherical ball 28 is made of ruby. The valve seat 50 and the plug 30 define the planar seating surfaces 12, 14 that extend perpendicular to the axis A of the valve member 20, and the seating surfaces 12, 14 are polished smooth. The valve body 16 includes a setting 54 and the valve seat 50 is press-fit into the setting 54. According to one exemplary embodiment, the valve body 16 and the valve member 20 are made of titanium or stainless steel. The valve body includes an inlet port 56, and the passageway 18 comprises an outlet port. In the exemplary embodiment presented, and as shown best in FIGS. 2 and 3, the outlet port 18 is connected to the orifice 52. A tube 58 is press fit into the outlet port 18 and acts as a volume reducer to limit the fluid volume in a flash vaporizer (not shown), where liquid passing through 58 is instantly flashed to steam. In such an application, for example, the function of the valve assembly 10 is to control liquid flow to a flash vaporizer and to control vaporizer pressure at a programmed setpoint. A pressure transducer monitors vaporizer pressure in the vaporizer & feeds back a signal through a PID controller to open/close the valve to maintain vaporizer pressure. The vaporizer also has an independent temperature control loop. The vaporizer operates at 140° C. which causes the valve to operate at about 120° C.

The valve member 20 can be moved using various types of mechanical and/or electrical components. However, in the exemplary embodiment shown, an electrical solenoid assembly is used to move the valve member 20 to control fluid flow between inlet and outlet ports of the valve body 16. As shown best in FIG. 2, the solenoid assembly includes an armature 60 of magnetic material fixed to the valve member 20, and an electrical solenoid winding 62 received coaxially over the armature 60 for moving the armature 60 and the valve member 20 along the axis A upon the application of an electrical current to the winding 62. The application of an electrical current to the winding 62, therefore, causes the valve member 20 to open or close the opening 52 of the valve seat 50 and is used to control fluid flow between the inlet and the outlet ports 56, 58.

In the exemplary embodiment shown, a spring 80 biases the valve member 20 towards the orifice 52 to normally cause the plug 30 to seal the opening 52 of the valve seat 50 and prevent fluid flow between the inlet and the outlet ports 56, 58. The valve assembly 10 is configured so that when electrical control currents are applied to the solenoid winding 62 by a suitable source, such as an output amplifier stage of a controller of a flow meter sensing an actual flow rate that is to be regulated by the valve assembly 10, the armature 60 is moved away from the valve seat 50 to open the opening 52 of the valve seat 50, and increase flow between the inlet and outlet ports 56, 58.

Figure 1:
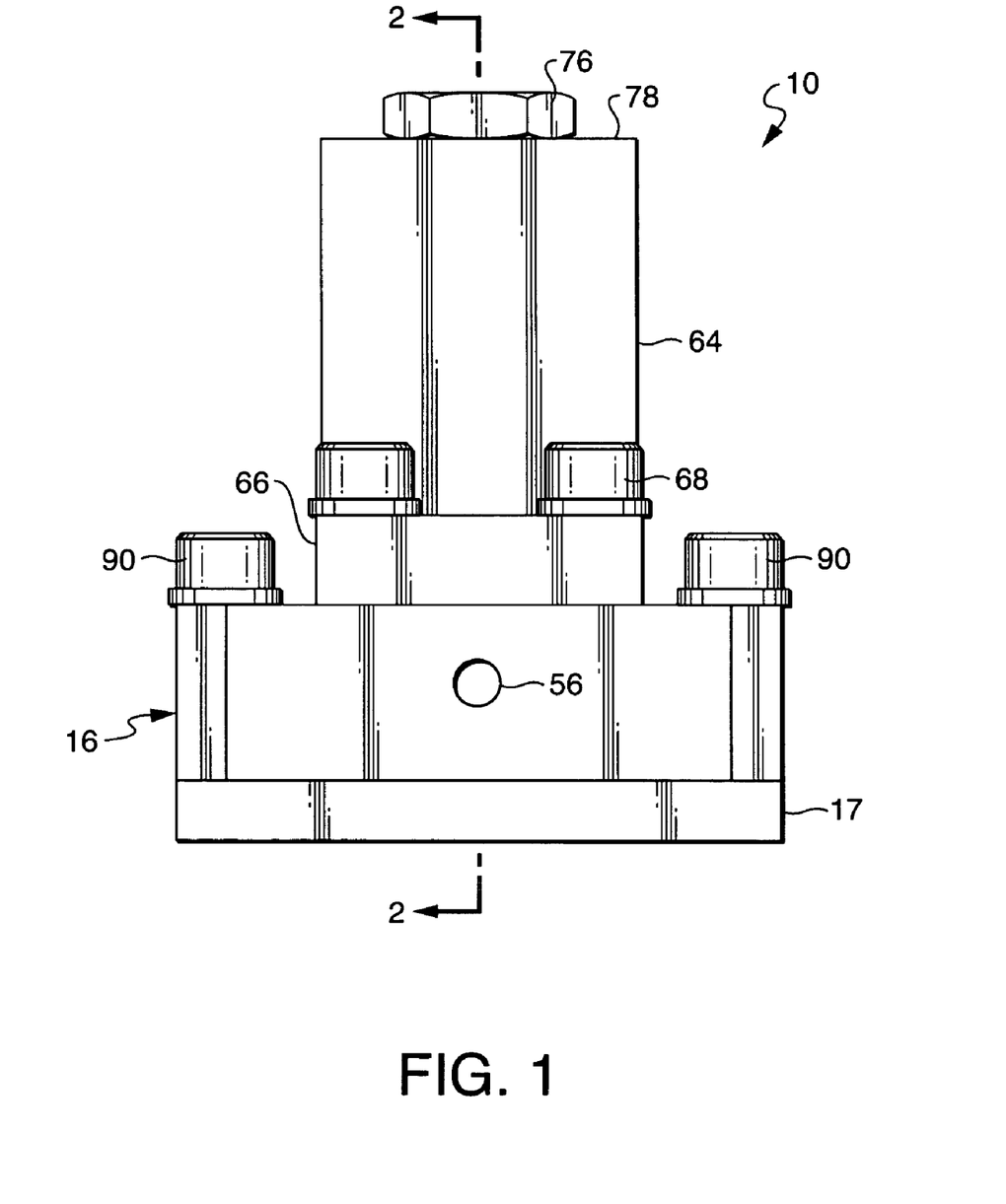
FIG. 1 is a side elevation view of an exemplary embodiment of a valve assembly constructed in accordance with the present disclosure.

The valve assembly 10 further includes a housing 64, as shown best in FIGS. 1 and 2, which is received over the solenoid winding 62 and has an annular flange 66 secured to the valve body 16, with screws 68 for example. A solenoid core 70 is positioned in the solenoid winding 62 above the armature 60, all of which are of appropriate magnetic material. A non-magnetic sleeve 72 is secured to the lower end of the solenoid core 70, and has a sufficiently large central axial opening to just freely accommodate movements of the armature 60 along the axis A. An annular Ferromagnetic spacer 74, and a spring 75 are positioned under the solenoid winding 62.

As shown in FIGS. 1 and 2, a locknut 76 secures the solenoid core 70 in place after threaded adjustment of the core through an end wall 78 of the housing 64, whereby turning the core 70 adjusts the position of the core 70 along the axis A, such that the starting position of the valve member 20 with respect to the valve seat 50 can also be adjusted by turning the core 76.

The spring biasing the valve member 20 comprises a flat spring 80 secured between an end of the non-magnetic sleeve 72 and the valve member 20. A clamping ring 82 secures the flat spring 80 to the end of the sleeve 72, and is in turn secured to the sleeve 72, with screws 84 for example. Essentially, only the axial preload force of the flat spring 80 needs to be overcome when the solenoid winding 62 is energized. It should be understood that only a very small axial motion of the valve member 20 is required to achieve full flow through the opening 52.

In the exemplary embodiment presented, and as shown best in FIGS. 1 through 3, a base 17 is attached to the valve body 16 with screws 90 for example. The base 17 can be made of a high temperature and chemical-resistant plastic material to provide some thermal insulation of the valve assembly from the heat of a vaporizer located below the valve assembly during use. As shown in FIGS. 2 and 3, the valve assembly 10 may also include suitable fluid-tight seals, such as resilient o-rings 92, 94 and 96, between the valve body 16 and the base 17, and the valve body 16 and the sleeve 72 of the valve member 20.

As an example of an application, a valve assembly 10 constructed in accordance with the present disclosure can be incorporated into a mass flow controller (MFC) 100 as depicted in FIG. 3B. Such an MFC 100 can be configured and arranged for controlling the flow rate of a gas from a source and can be used, for example, in semiconductor manufacturing applications to precisely deliver a process vapor (or one or more gases)to a process chamber for making a semiconductor wafer or device. The MFC 100 may be temperature-based MFC or pressure-based, as well as other types of flow control devices. A suitable MFC is shown, for example, in U.S. Pat. No. 6,505,812, which is assigned to the assignee of the present disclosure and incorporated herein by reference.

With continued reference to FIG. 3B, Although not shown, an MFC 100 can include a flow path 102 connected to the inlet port 56 of the valve assembly 10, a flow sensor assembly 104 for sensing flow through the flow path, and a control device 106 programmed to receive a predetermined desired flow rate from a user, receive an indication of flow from the flow sensor assembly 104, and determine an actual flow rate through the flow path 102. The control device 106 can also be programmed to provide an increasing electrical charge to the winding 62 (e.g., of FIG. 3A) in order to increase flow if the actual flow rate is less than the desired flow rate, and to remove the electrical charge to decrease flow if the actual flow rate is greater than the desired flow rate. By "control device" it is meant herein a device or mechanism used to regulate or guide the operation of the MFC 1000. The control device 106 preferably includes a computer or central processing unit (CPU) including at least a processor, memory and clock, e.g., mounted on a circuit board. The control device 106 can be configured to operate in a feedback loop to maintain the desired flow at all times. Information on flow rate as a function of the control current of the solenoid winding 62 (e.g., of FIG. 3A) is preferably stored in the control device 106 in order to quicken the response time of the MFC 100.

As another example of an application, a valve assembly 10 constructed in accordance with the present disclosure can be used to control the flow of highly corrosive deionized water (DI) at very low flow rates (e.g., 0.04 cc/min. to 2.40 cc/min.) into a flash vaporizer running at 140° C. In such an application the valve assembly 10 operates at about 120° C. The valve assembly 10 is the feed valve to the flash vaporizer and is operated to open or close in response to a pressure sensed in the vaporizer (e.g., pressure below setpoint opens the valve wider). In the flow "OFF" state, the valve should seal well enough to prevent leakage into the vaporizer, which would cause pressure to continue rising.

The present disclosure, therefore, provides a new and improved valve assembly 10. Among other aspects and advantages, the valve assembly 10 provides improved cut-off sealing, eliminates the need for hand-crafted metal parts, allows the use of impervious non-metal material for seating surfaces 12, 14, and provides stable long term control valve shut-off capability.

The embodiments and practices described in this specification have been presented by way of illustration rather than limitation, and various modifications, combinations and substitutions may be effected by those skilled in the art without departure either in spirit or scope from this disclosure in its broader aspects and as set forth in the appended claims.

The invention claimed is:

1. A valve assembly comprising:
   a valve body including an orifice;
   a valve member received in the valve body and movable along an axis with respect to the orifice, the valve member including a cup in an end of the valve member having an end wall facing the orifice of the valve body;
   a fulcrum extending from the end wall of the cup towards the orifice;
   a plug received in the cup of the valve member against the fulcrum and opposite the orifice of the valve body such that, when the valve member is moved along the axis towards the orifice, the plug contacts the valve body to seal the orifice;
   a flat spring having an outer portion secured to the end of the valve member and flexible arms retaining the plug in the cup so that the plug can be articulated about the fulcrum to properly align the plug with the valve body and fully seal the orifice when the valve member is moved along the axis towards the orifice, wherein the flat spring is secured to the end of the valve member with a clamping ring; and
   a valve seat secured to the valve body and defining the orifice, wherein the valve seat is sized and adapted so that a planar seating surface of the valve seat will extend through central openings of the flat spring and the clamping ring to contact a planar seating surface of the plug to seal the orifice when the valve member is moved along the axis towards the valve seat.

2. A valve assembly according to claim 1, wherein the valve member includes a socket in the end wall of the cup, and the fulcrum comprises a spherical ball received in the socket of the valve member, wherein the ball is sized so that a portion of the ball extends into the cup.

3. A valve assembly according to claim 1, wherein the valve seat and the plug are made of a rigid, impervious non-metal material.

4. A valve assembly according to claim 3, wherein the valve seat and the plug are made of sapphire.

5. A valve assembly according to claim 4, wherein the spherical ball is made of ruby.

6. A valve assembly according to claim 3, wherein the valve body includes a setting around and the valve seat is press-fit into the setting.

7. A valve assembly according to claim 3, wherein the valve seat and the plug have planar seating surfaces that extend generally perpendicular to the axis of the valve member.

8. A valve assembly according to claim 7, wherein the seating surfaces are polished.

9. A valve assembly according to claim 1, wherein the valve body and the valve member are made of stainless steel.

10. A valve assembly according to claim 1, wherein the flat spring is secured to the end of the valve member with screws.

11. A valve assembly according to claim 1, wherein the end of the valve member includes a continuous ridge receiving the flat spring and the clamping ring includes a continuous ridge securing the flat spring against the continuous ridge of a side wall.

12. A valve assembly according to claim 1, further comprising a spacer ring positioned between the end of the valve member and the flat spring.

13. A valve assembly according to claim 1, wherein the outer portion of the flat spring is annular and the flat spring includes at least three of the flexible arms, which extend radially inwardly from the annular outer portion towards the axis of the valve member.

14. A valve assembly according to claim 1, wherein the plug is cylindrical.

15. A valve assembly according to claim 1, further comprising:
   an armature of magnetic material fixed to the valve member; and
   an electrical solenoid winding coaxially surrounding the armature and extending along the axis, wherein energizing the winding causes the valve member to be moved along the axis by the armature.

16. A valve assembly according to claim 1, further comprising a return spring secured between the valve body and the valve member to bias the valve member with respect to the orifice.

17. A flow controller including a valve assembly according to claim 1, and further comprising:
   a flow path connected to the orifice of the valve body;
   a flow sensor assembly for sensing flow through the flow path; and
   a control device programmed to,
      receive a desired flow rate from a user input device,
      receive an indication of flow from the flow sensor assembly,
      determine an actual flow rate through the flow path,
      cause the valve member of the valve assembly to move away from the orifice to increase flow through the orifice if the actual flow rate is less than the desired flow rate, and
      cause the valve member to move towards the orifice to decrease flow if the actual flow rate is greater than the desired flow rate.

* * * * *